US012803322B2

(12) United States Patent
Asari et al.

(10) Patent No.: US 12,803,322 B2
(45) Date of Patent: Nov. 17, 2026

(54) POWER SUPPLY SYSTEM, MOVING OBJECT, AND METHOD OF CONTROLLING POWER SUPPLY SYSTEM

(71) Applicant: HONDA MOTOR CO., LTD., Tokyo (JP)

(72) Inventors: Norihiro Asari, Wako (JP); Kenji Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/087,914

(22) Filed: Mar. 24, 2025

(65) Prior Publication Data

US 2025/0309677 A1 Oct. 2, 2025

(30) Foreign Application Priority Data

Mar. 28, 2024 (JP) ................................ 2024-054372

(51) Int. Cl.
*H02J 1/10* (2026.01)
*H02J 7/34* (2006.01)
*H02J 9/06* (2006.01)

(52) U.S. Cl.
CPC ................ *H02J 9/061* (2013.01); *H02J 1/10* (2013.01); *H02J 7/34* (2013.01); *H02J 9/068* (2020.01)

(58) Field of Classification Search
CPC .... H02J 1/084; H02J 1/086; H02J 1/10; H02J 1/106; H02J 1/109; H02J 1/12; H02J 3/38; H02J 3/381; H02J 3/46; H02J 3/466; H02J 7/34; H02J 9/04; H02J 9/06; H02J 9/061; H02J 9/068; H02J 2105/32
See application file for complete search history.

(56) References Cited

U.S. PATENT DOCUMENTS

| | | | | |
|---|---|---|---|---|
| 12,051,931 B2 * | 7/2024 | Matsumoto | ............. | H02J 7/865 |
| 2011/0285202 A1 * | 11/2011 | Rozman | .................... | H02J 1/10 307/23 |
| 2018/0354436 A1 * | 12/2018 | Sato | ...................... | B60R 16/033 |
| 2022/0204173 A1 | 6/2022 | Barraco et al. | | |

(Continued)

FOREIGN PATENT DOCUMENTS

JP 2022-529997 A 6/2022

OTHER PUBLICATIONS

European Search Report Corresponding to EP Application No. 25166175.7, dated Oct. 13, 2025, 9 pages.

*Primary Examiner* — Levi Gannon
(74) *Attorney, Agent, or Firm* — Rankin, Hill & Clark LLP

(57) ABSTRACT

A electrical power supply system is equipped with a first electrical power supply circuit, a second electrical power supply circuit, a connection circuit including a connection device capable of connecting the first electrical power supply circuit and the second electrical power supply circuit to each other, a control device, and a disconnection device. The connection circuit also includes a reactor connected in series to the connection device. In a case that a failure has occurred in the supply of electrical power from a first electrical power generating device to the first electrical power supply circuit, the control device executes a connection control on the connection device in a state in which the first electrical power supply circuit and the connection circuit are disconnected from the first electrical power generating device by the disconnection device.

7 Claims, 12 Drawing Sheets

(56) References Cited

U.S. PATENT DOCUMENTS

| | | | | |
|---|---|---|---|---|
| 2022/0271560 | A1* | 8/2022 | Mitani | H02J 1/086 |
| 2022/0285964 | A1 | 9/2022 | Mitani et al. | |
| 2023/0198290 | A1* | 6/2023 | Kobayashi | H02J 1/10<br>307/23 |
| 2023/0253820 | A1* | 8/2023 | Mitani | H02J 9/061<br>307/23 |
| 2023/0318303 | A1 | 10/2023 | Mitani et al. | |
| 2023/0318337 | A1* | 10/2023 | Mitani | H02J 7/855<br>320/166 |

* cited by examiner

POWER SUPPLY SYSTEM, MOVING OBJECT, AND METHOD OF CONTROLLING POWER SUPPLY SYSTEM

CROSS-REFERENCE TO RELATED APPLICATIONS

This application is based upon and claims the benefit of priority from Japanese Patent Application No. 2024-054372 filed on Mar. 28, 2024, the contents of which are incorporated herein by reference.

BACKGROUND OF THE INVENTION

Field of the Invention

The present disclosure relates to an electrical power supply system, a moving object, and a method of controlling an electrical power supply system.

Description of the Related Art

In recent years, research and development have been conducted on electrification technologies that contribute to energy efficiency in order to ensure that more people have access to affordable, reliable, sustainable and modern energy.

In JP 2022-529997 A, an aircraft electrical energy supply network (electrical power supply system) is disclosed.

SUMMARY OF THE INVENTION

There is a demand for a more satisfactory electrical power supply system, a more satisfactory moving object, and a method of more satisfactorily controlling such an electrical power supply system.

The present invention has the object of solving the aforementioned problem.

A first aspect of the present disclosure is characterized by an electrical power supply system including a first electrical power supply circuit configured to supply to a first load device an electrical power output from a first electrical power generating device, the electrical power being a direct current electrical power, a second electrical power supply circuit configured to supply to a second load device an electrical power output from a second electrical power generating device, the electrical power being a direct current electrical power, a connection circuit equipped with a connection device configured to connect the first electrical power supply circuit and the second electrical power supply circuit to each other, and a control device configured to execute a connection control on the connection device in order to connect the first electrical power supply circuit and the second electrical power supply circuit to each other via the connection circuit, and a disconnection device configured to disconnect the first electrical power generating device from the first electrical power supply circuit and the connection circuit, wherein the connection circuit is further equipped with a reactor configured to be connected in series to the connection device, and in a case that a failure has occurred in supply of the electrical power from the first electrical power generating device to the first electrical power supply circuit, the control device executes the connection control on the connection device in a state in which the first electrical power supply circuit and the connection circuit are disconnected from the first electrical power generating device by the disconnection device.

A second aspect of the present disclosure is characterized by a moving object including the electrical power supply system according to the first aspect.

A third aspect of the present disclosure is characterized by a method of controlling an electrical power supply system, the electrical power supply system including a first electrical power supply circuit configured to supply to a first load device an electrical power output from a first electrical power generating device, the electrical power being a direct current electrical power, a second electrical power supply circuit configured to supply to a second load device an electrical power output from a second electrical power generating device, the electrical power being a direct current electrical power, a connection circuit equipped with a connection device configured to connect the first electrical power supply circuit and the second electrical power supply circuit to each other, and a disconnection device configured to disconnect the first electrical power generating device from the first electrical power supply circuit and the connection circuit, the connection circuit being further equipped with a reactor configured to be connected in series to the connection device, the method including in a case that a failure has occurred in supply of the electrical power from the first electrical power generating device to the first electrical power supply circuit, executing a connection control on the connection device in order to connect the first electrical power supply circuit and the second electrical power supply circuit to each other via the connection circuit in a state in which the first electrical power supply circuit and the connection circuit are disconnected from the first electrical power generating device by the disconnection device.

According to the present disclosure, it is possible to provide a more satisfactory electrical power supply system, a more satisfactory moving object, and a method of more satisfactorily controlling such an electrical power supply system.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

An electrical power supply system is provided with, for example, a first electrical power supply circuit for supplying DC electrical power output from a first electrical power generating device to a first load device, and a second electrical power supply circuit for supplying DC electrical power output from a second electrical power generating device to a second load device. Also, the electrical power supply system includes a connection circuit equipped with a connection device that is capable of connecting the first electrical power supply circuit and the second electrical power supply circuit. In this case, when connection control for connecting the first electrical power supply circuit and the second electrical power supply circuit to each other via the connection circuit is performed, an inrush current flows from one electrical power supply circuit to the other electrical power supply circuit. That is, an inrush current flows in the first electrical power supply circuit or the second electrical power supply circuit. In this case, there is a concern that the electronic devices provided in the first electrical power supply circuit or the second electrical power supply circuit may be damaged by the inrush current. The present disclosure may provide an electrical power supply system, a moving object, and a method of controlling the electrical power supply system capable of suppressing damage to an electronic device due to an inrush current.

Figure 1:
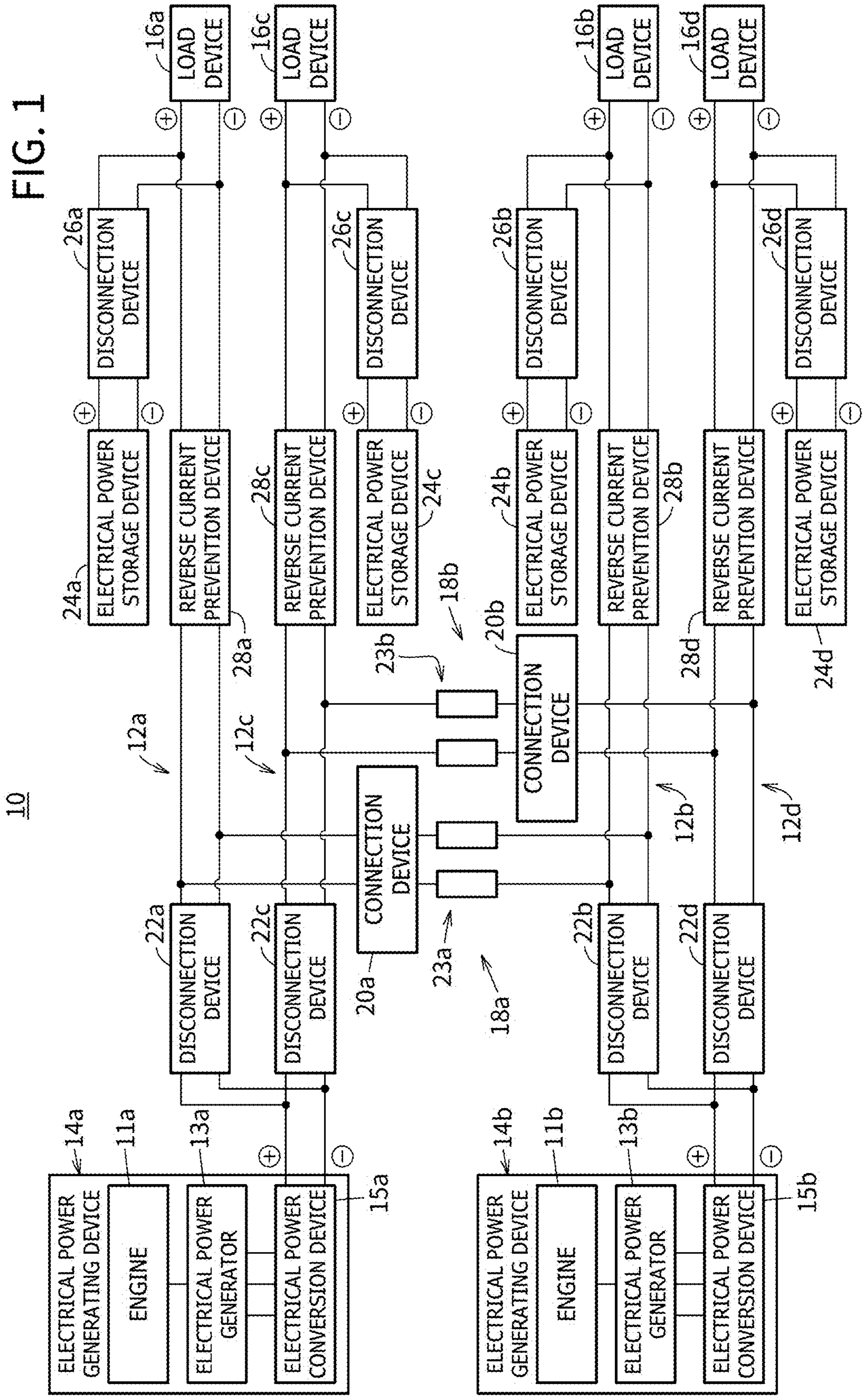
FIG. 1 is a schematic diagram of the electrical power supply system according to an embodiment.

FIG. 1 is a schematic diagram of an electrical power supply system 10 according to the present embodiment. As shown in FIG. 1, the electrical power supply system 10 includes a first electrical power supply circuit 12*a*, a second electrical power supply circuit 12*b*, a third electrical power supply circuit 12*c*, and a fourth electrical power supply circuit 12*d*.

The first electrical power supply circuit 12*a* supplies DC electrical power output from a first electrical power generating device 14*a* to a first load device 16*a*. The second electrical power supply circuit 12*b* supplies DC electrical power output from a second electrical power generating device 14*b* to a second load device 16*b*. The third electrical power supply circuit 12*c* supplies the DC electrical power output from the first electrical power generating device 14*a* to a third load device 16*c*. The fourth electrical power supply circuit 12*d* supplies the DC electrical power output from the second electrical power generating device 14*b* to a fourth load device 16*d*.

The first electrical power generating device 14*a* includes a first engine 11*a*, a first electrical power generator 13*a*, and a first electrical power conversion device 15*a*. The second electrical power generating device 14*b* includes a second engine 11*b*, a second electrical power generator 13*b*, and a second electrical power conversion device 15*b*. The first engine 11*a* and the second engine 11*b* are, for example, gas turbine engines. The first engine 11*a* and the second engine 11*b* may be other engines such as reciprocating engines. The first electrical power generator 13*a* is driven by the first engine 11*a* and generates three-phase AC electrical power. The first electrical power conversion device 15*a* converts the three-phase AC electrical power output from the first electrical power generator 13*a* into DC electrical power. The second electrical power generator 13*b* is driven by the second engine 11*b* and generates three-phase AC electrical power. The second electrical power conversion device 15*b* converts the three-phase AC electrical power output from the second electrical power generator 13*b* into DC electrical power.

Figure 2:
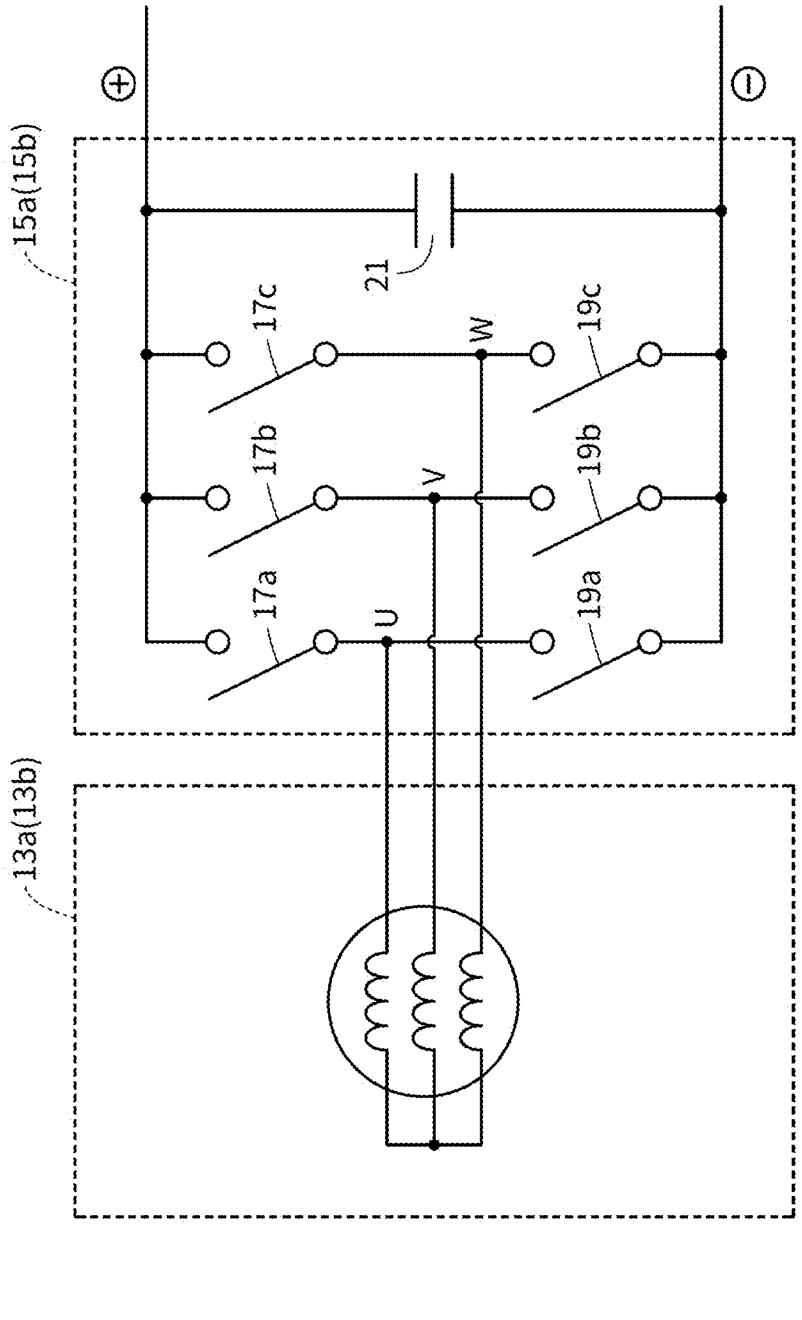
FIG. 2 is a schematic diagram of a first electrical power generating device.

FIG. 2 is a schematic diagram of the first electrical power generating device 14*a* according to the present embodiment. The configuration of the second electrical power generating device 14*b* is the same as that of the first electrical power generating device 14*a*. As shown in FIG. 2, the first electrical power conversion device 15*a* of the first electrical power generating device 14*a* includes switching elements 17*a* to 17*c* of the upper arm, switching elements 19*a* to 19*c* of the lower arm, and a smoothing capacitor 21.

Each of the switching elements 17*a* to 17*c* and the switching elements 19*a* to 19*c* is a semiconductor switch such as a MOSFET (Metal Oxide Semiconductor Field Effect Transistor) and an IGBT (Insulated Gate Bipolar Transistor). A freewheeling diode may be provided in parallel with each of the switching elements 17*a* to 17*c* and the switching elements 19*a* to 19*c*.

In the first electrical power conversion device 15*a*, the three-phase AC electrical power output from the first electrical power generator 13*a* is rectified and converted into DC electrical power by controlling the timing of turning on and off of the switching elements 17*a* to 17*c* and the switching elements 19*a* to 19*c*. The voltage fluctuation of the rectified DC electrical power is suppressed by the smoothing capacitor 21, and the DC electrical power having a stable voltage is output from the first electrical power conversion device 15*a*. In the case that the first electrical power generator 13*a* is started, the smoothing capacitor 21 needs to be charged in advance.

The first electrical power conversion device 15*a* and the second electrical power conversion device 15*b* may also include various sensors such as a voltage sensor and a current sensor, and various elements such as fuses, relays, breakers, diodes, transistors, resistors, coils, capacitors, or the like.

Figure 12:
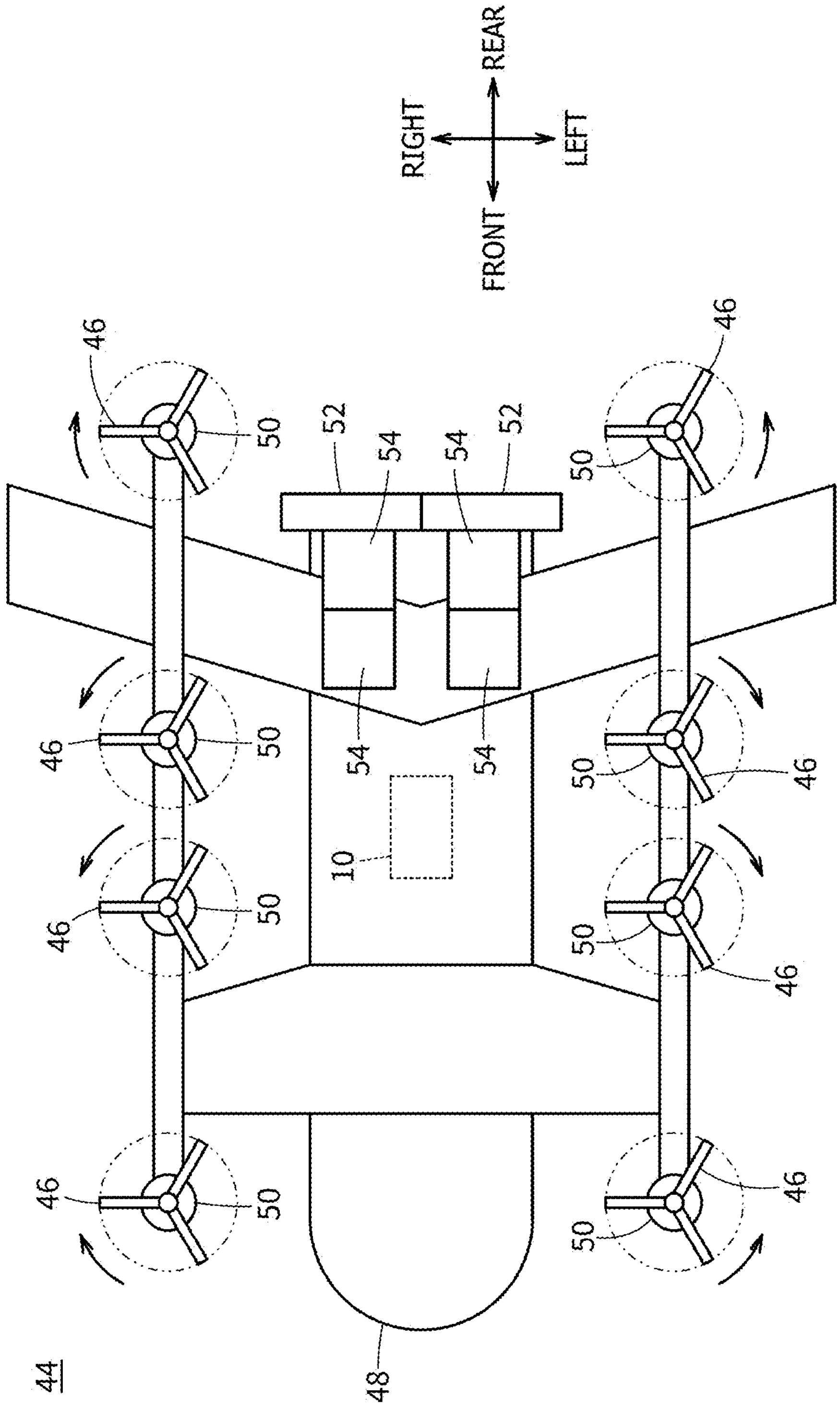
FIG. 12 is a schematic diagram of a moving object.

As shown in FIG. 1, each of the first load device 16*a*, the second load device 16*b*, the third load device 16*c*, and the fourth load device 16*d* have, for example, unillustrated inverters and electric motors 50 and 54 (see FIG. 12). The inverter converts an input DC electrical power into three-phase AC electrical power, and the electric motors 50 and 54 are driven by the three-phase AC electrical power. Each of the first load device 16*a*, the second load device 16*b*, the third load device 16*c*, and the fourth load device 16*d* may include a DC/DC converter and a low voltage drive device, neither of which is illustrated. The DC/DC converter causes the voltage of the input DC electrical power to be lowered, and the low voltage drive device is driven by the DC electrical power.

The first load device 16*a*, the second load device 16*b*, the third load device 16*c*, and the fourth load device 16*d* may also include various sensors such as voltage sensors and current sensors or the like, and various elements such as fuses, relays, breakers, diodes, transistors, resistors, coils, capacitors, or the like. A plurality of the first load devices 16*a* may be connected in parallel to the first electrical power supply circuit 12*a*. A plurality of the second load devices 16*b* may be connected in parallel to the second electrical power supply circuit 12*b*. A plurality of the third load devices 16*c* may be connected in parallel to the third electrical power supply circuit 12*c*. A plurality of the fourth load devices 16*d* may be connected in parallel to the fourth electrical power supply circuit 12*d*.

The electrical power supply system 10 is equipped with a connection circuit 18*a* and a connection circuit 18*b*. The connection circuit 18*a* includes a connection device 20*a* and reactors 23*a*. The connection circuit 18*b* includes a connection device 20*b* and reactors 23*b*.

The connection device 20*a* is capable of connecting the first electrical power supply circuit 12*a* and the second electrical power supply circuit 12*b*. The connection device 20*a* switches between a state in which the first electrical power supply circuit 12*a* and the second electrical power supply circuit 12*b* are connected and a state in which the first electrical power supply circuit 12*a* and the second electrical power supply circuit 12*b* are disconnected, by a contactor (not shown). Each of the reactors 23*a* is connected in series to the connection device 20*a*. The reactor 23*a* is provided on each of the positive and negative power lines of the connection circuit 18*a*.

In a similar manner, the connection device 20*b* is capable of connecting the third electrical power supply circuit 12*c* and the fourth electrical power supply circuit 12*d*. The connection device 20*b* switches between a state in which the third electrical power supply circuit 12*c* and the fourth electrical power supply circuit 12*d* are connected and a state in which the third electrical power supply circuit 12*c* and the fourth electrical power supply circuit 12*d* are disconnected, by a contactor (not shown). The reactors 23*b* are connected in series to the connection device 20*b*. The reactor 23*b* is provided on each of the positive and negative power lines of the connection circuit 18*b*.

Each of the connection device 20*a* and the connection device 20*b* may include a relay instead of the contactor. Each of the connection device 20*a* and the connection device 20*b* may include a breaker instead of the contactor. Each of the connection device 20*a* and the connection device 20*b* may include a semiconductor switch instead of the contactor. The reactors 23*a* and the reactors 23*b* may be air-core reactors or iron-core reactors. Each of the reactors 23*a* and 23*b* is an inductor (a passive electrical component) in which an electrical wire is wound in a coil shape. When an electrical current flows through each of the coils of the reactors 23*a* and 23*b*, a magnetic field (counter-electromotive force) is generated in the coil, and the magnetic field (counter-electromotive force) prevents the current from flowing.

Normally, the first electrical power supply circuit 12*a* and the second electrical power supply circuit 12*b* are disconnected. Consequently, in the case that an abnormality has occurred in one of the first electrical power supply circuit 12*a* or the second electrical power supply circuit 12*b*, it is possible to prevent the abnormality from adversely influencing the other. For example, when an overcurrent occurs in one of the first electrical power supply circuit 12*a* or the second electrical power supply circuit 12*b*, the overcurrent is prevented from flowing to the other.

Similarly, the third electrical power supply circuit 12*c* and the fourth electrical power supply circuit 12*d* are normally disconnected. Consequently, in the case that an abnormality has occurred in one of the third electrical power supply circuit 12*c* or the fourth electrical power supply circuit 12*d*, it is possible to prevent the abnormality from adversely influencing the other. For example, when an overcurrent occurs in one of the third electrical power supply circuit 12*c* or the fourth electrical power supply circuit 12*d*, the overcurrent is prevented from flowing to the other.

In the case that a failure has occurred in the supply of electrical power from the first electrical power generating device 14*a* to the first electrical power supply circuit 12*a*, the first electrical power supply circuit 12*a* and the second electrical power supply circuit 12*b* are connected by the connection device 20*a*. In accordance with this feature, the electrical power is supplied from the second electrical power supply circuit 12*b* to the first electrical power supply circuit 12*a*. As mentioned above, the connection circuit 18*a* for connecting the first electrical power supply circuit 12*a* and the second electrical power supply circuit 12*b* is equipped with the connection device 20*a* and the reactors 23*a*. The reactors 23*a* are connected in series to the connection device 20*a* as described above. When the supply of electric power from the second electrical power supply circuit 12*b* to the first electrical power supply circuit 12*a* is started, a counter-electromotive force is generated in each of the reactors 23*a*, and therefore a peak value of the inrush current flowing from the second electrical power supply circuit 12*b* to the first electrical power supply circuit 12*a* is suppressed to be low. In accordance with this feature, electronic devices provided in the first electrical power supply circuit 12*a* can be protected.

In the case that a failure has occurred in the supply of electrical power from the first electrical power generating device 14*a* to the third electrical power supply circuit 12*c*, the third electrical power supply circuit 12*c* and the fourth electrical power supply circuit 12*d* are connected by the connection device 20*b*. In accordance with this feature, the electrical power is supplied from the fourth electrical power supply circuit 12*d* to the third electrical power supply circuit 12*c*. As mentioned above, the connection circuit 18*b* for connecting the third electrical power supply circuit 12*c* and the fourth electrical power supply circuit 12*d* is equipped with the connection device 20*b* and the reactors 23*b*. Each of the reactors 23*b* are connected in series to the connection device 20*b* as described above. When the supply of electrical power from the fourth electrical power supply circuit 12*d* to the third electrical power supply circuit 12*c* is started, a counter-electromotive force is generated in the reactor 23*b*, and therefore a peak value of the inrush current flowing from the fourth electrical power supply circuit 12*d* to the third electrical power supply circuit 12*c* is suppressed to be low. In accordance with this feature, electronic devices provided in the third electrical power supply circuit 12*c* can be protected.

In the case that a failure has occurred in the supply of electrical power from the second electrical power generating device 14*b* to the second electrical power supply circuit 12*b*, the first electrical power supply circuit 12*a* and the second electrical power supply circuit 12*b* are connected by the connection device 20*a*. In accordance with this feature, the electrical power is supplied from the first electrical power supply circuit 12*a* to the second electrical power supply circuit 12*b*. When the supply of electric power from the first electrical power supply circuit 12*a* to the second electrical power supply circuit 12*b* is started, a counter-electromotive force is generated in each of the reactors 23*a*, and therefore a peak value of the inrush current flowing from the first electrical power supply circuit 12*a* to the second electrical power supply circuit 12*b* is suppressed to be low. In accordance with this feature, electronic devices provided in the second electrical power supply circuit 12*b* can be protected.

In the case that a failure has occurred in the supply of electrical power from the second electrical power generating device 14*b* to the fourth electrical power supply circuit 12*d*, the third electrical power supply circuit 12*c* and the fourth electrical power supply circuit 12*d* are connected by the connection device 20*b*. In accordance with this feature, the electrical power is supplied from the third electrical power supply circuit 12*c* to the fourth electrical power supply circuit 12*d*. When the supply of electric power from the third electrical power supply circuit 12*c* to the fourth electrical power supply circuit 12*d* is started, a counter-electromotive force is generated in each of the reactors 23*b*, and therefore a peak value of the inrush current flowing from the third electrical power supply circuit 12*c* to the fourth electrical power supply circuit 12*d* is suppressed to be low. In accordance with this feature, electronic devices provided in the fourth electrical power supply circuit 12*d* can be protected.

The electrical power supply system 10 is equipped with disconnection devices 22*a* to 22*d*. The disconnection device 22*a* is capable of disconnecting the first electrical power generating device 14*a* from the first electrical power supply circuit 12*a* and the connection circuit 18*a*. The disconnection device 22*b* is capable of disconnecting the second electrical power generating device 14*b* from the second electrical power supply circuit 12*b* and the connection circuit 18*a*. The disconnection device 22*c* is capable of disconnecting the first electrical power generating device 14*a* from the third electrical power supply circuit 12*c* and the connection circuit 18*b*. The disconnection device 22*d* is capable of disconnecting the second electrical power generating device 14*b* from the fourth electrical power supply circuit 12*d* and the connection circuit 18*b*.

The disconnection device 22*a* switches between a state in which the first electrical power generating device 14*a* is disconnected from the first electrical power supply circuit 12*a* and the connection circuit 18*a* and a state in which the first electrical power generating device 14*a* is connected to the first electrical power supply circuit 12*a* and the connection circuit 18*a*, by a contactor (not shown). Similarly, the disconnection device 22*b* switches between a state in which the second electrical power generating device 14*b* is disconnected from the second electrical power supply circuit 12*b* and the connection circuit 18*a* and a state in which the second electrical power generating device 14*b* is connected to the second electrical power supply circuit 12*b* and the connection circuit 18*a*, by a contactor (not shown).

Further, the disconnection device 22*c* switches between a state in which the first electrical power generating device 14*a* is disconnected from the third electrical power supply circuit 12*c* and the connection circuit 18*b* and a state in which the first electrical power generating device 14*a* is connected to the third electrical power supply circuit 12*c* and the connection circuit 18*b*, by a contactor (not shown). Similarly, the disconnection device 22*d* switches between a state in which the second electrical power generating device 14*b* is disconnected from the fourth electrical power supply circuit 12*d* and the connection circuit 18*b* and a state in which the second electrical power generating device 14*b* is connected to the fourth electrical power supply circuit 12*d* and the connection circuit 18*b*, by a contactor (not shown).

The disconnection devices 22*a* to 22*d* may include relays instead of contactors. The disconnection devices 22*a* to 22*d* may include breakers instead of the contactors. The disconnection devices 22*a* to 22*d* may include semiconductor switches instead of the contactors.

The electrical power supply system 10 is provided with a first electrical power storage device 24*a*, a second electrical power storage device 24*b*, a third electrical power storage device 24*c*, and a fourth electrical power storage device 24*d*. The first electrical power storage device 24*a* is connected to the first electrical power supply circuit 12*a*, in parallel with the first electrical power generating device 14*a*. The second electrical power storage device 24*b* is connected to the second electrical power supply circuit 12*b*, in parallel with the second electrical power generating device 14*b*. The third electrical power storage device 24*c* is connected to the third electrical power supply circuit 12*c*, in parallel with the first electrical power generating device 14*a*. The fourth electrical power storage device 24*d* is connected to the fourth electrical power supply circuit 12*d*, in parallel with the second electrical power generating device 14*b*.

The first electrical power storage device 24*a*, the second electrical power storage device 24*b*, the third electrical power storage device 24*c*, and the fourth electrical power storage device 24*d* each include a lithium ion battery. The first electrical power storage device 24*a*, the second electrical power storage device 24*b*, the third electrical power storage device 24*c*, and the fourth electrical power storage device 24*d* may each include a secondary battery other than a lithium ion battery. The first electrical power storage device 24*a*, the second electrical power storage device 24*b*, the third electrical power storage device 24*c*, and the fourth electrical power storage device 24*d* may each include a large-capacity capacitor.

The first electrical power storage device 24*a*, the second electrical power storage device 24*b*, the third electrical power storage device 24*c*, and the fourth electrical power storage device 24*d* may also include various sensors such as voltage sensors and current sensors or the like, and various elements such as fuses, relays, breakers, diodes, transistors, resistors, coils, capacitors, or the like.

The electrical power supply system 10 is equipped with disconnection devices 26*a* to 26*d*. The disconnection device 26*a* is capable of disconnecting the first electrical power storage device 24*a* from the first electrical power supply circuit 12*a* and the first load device 16*a*. The disconnection device 26*b* is capable of disconnecting the second electrical power storage device 24*b* from the second electrical power supply circuit 12*b* and the second load device 16*b*. The disconnection device 26*c* is capable of disconnecting the third electrical power storage device 24*c* from the third electrical power supply circuit 12*c* and the third load device 16*c*. The disconnection device 26*d* is capable of disconnecting the fourth electrical power storage device 24*d* from the fourth electrical power supply circuit 12*d* and the fourth load device 16*d*.

The disconnection device 26*a* switches between a state in which the first electrical power storage device 24*a* is disconnected from the first electrical power supply circuit 12*a* and the first load device 16*a* and a state in which the first electrical power storage device 24*a* is connected to the first electrical power supply circuit 12*a* and the first load device 16*a*, by a contactor (not shown). Similarly, the disconnection device 26*b* switches between a state in which the second electrical power storage device 24*b* is disconnected from the second electrical power supply circuit 12*b* and the second load device 16*b* and a state in which the second electrical power storage device 24*b* is connected to the second electrical power supply circuit 12*b* and the second load device 16*b*, by a contactor (not shown).

The disconnection device 26*c* switches between a state in which the third electrical power storage device 24*c* is disconnected from the third electrical power supply circuit 12*c* and the third load device 16*c* and a state in which the third electrical power storage device 24*c* is connected to the third electrical power supply circuit 12*c* and the third load device 16*c*, by a contactor (not shown). Similarly, the disconnection device 26*d* switches between a state in which the fourth electrical power storage device 24*d* is disconnected from the fourth electrical power supply circuit 12*d* and the fourth load device 16*d* and a state in which the fourth electrical power storage device 24*d* is connected to the fourth electrical power supply circuit 12*d* and the fourth load device 16*d*, by a contactor (not shown).

The disconnection devices 26*a* to 26*d* may include relays instead of contactors. The disconnection devices 26*a* to 26*d* may include breakers instead of the contactor. The disconnection devices 26*a* to 26*d* may include semiconductor switches instead of the contactors.

The electrical power supply system 10 is equipped with reverse current prevention devices 28*a* to 28*d*. The reverse current prevention device 28*a* restricts the supply of electrical power from the first electrical power storage device 24*a* to the first electrical power supply circuit 12*a*. The reverse current prevention device 28*b* restricts the supply of electrical power from the second electrical power storage device 24*b* to the second electrical power supply circuit 12*b*. The reverse current prevention device 28*c* restricts the supply of electrical power from the third electrical power storage device 24*c* to the third electrical power supply circuit 12*c*. The reverse current prevention device 28*d* restricts the supply of electrical power from the fourth electrical power storage device 24*d* to the fourth electrical power supply circuit 12*d*.

Figure 3:
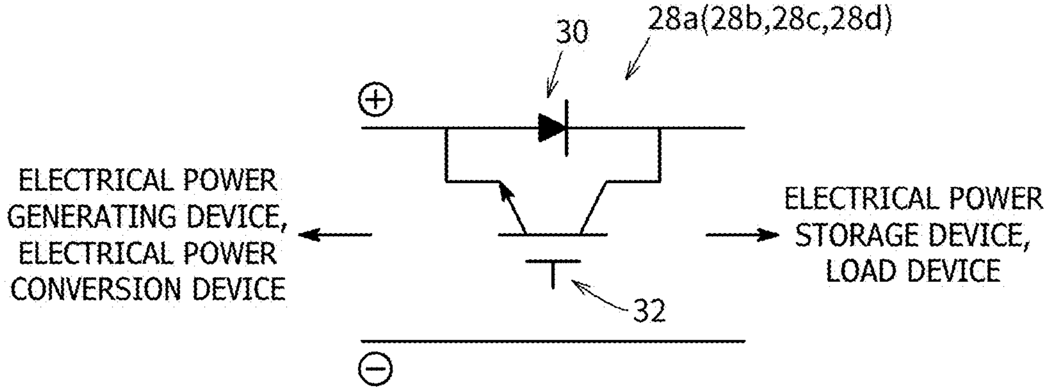
FIG. 3 is a schematic diagram illustrating the configuration of a reverse current prevention device.

FIG. 3 is a schematic diagram illustrating a configuration of the reverse current prevention device 28*a* according to the present embodiment. As shown in FIG. 3, the configurations of the reverse current prevention devices 28*b* to 28*d* are the same as those of the reverse current prevention device 28*a*. The reverse current prevention device 28*a* includes a diode 30 and a transistor 32.

The diode 30 is provided in the wiring of the positive electrode. In the case that the voltage of the anode is lower than the voltage of the cathode, the diode 30 conducts little current. In the case that the voltage of the anode is higher than the voltage of the cathode and the potential difference between the cathode and the anode is equal to or higher than the forward voltage, the diode 30 causes a current to flow. As a result, electrical power is supplied from the first electrical power supply circuit 12*a* to the first load device 16*a* and the first electrical power storage device 24*a* via the diode 30. On the other hand, no electrical power is supplied from the first load device 16*a* and the first electrical power storage device 24*a* to the first electrical power supply circuit 12*a* via the diode 30.

The transistor 32 is provided bypassing the diode 30. When a current flows from the base to the emitter of the transistor 32, a current flows from the collector to the emitter. As a result, electrical power is supplied from the first electrical power storage device 24*a* to the first electrical power supply circuit 12*a* via the transistor 32. In the case that the electrical power is not supplied from the first electrical power storage device 24*a* to the first electrical power supply circuit 12*a*, the transistor 32 may be omitted. Instead of the transistor 32, another switching element may be used, or a contactor may be used.

The diode 30 may be provided in the wiring of the negative electrode. The diode 30 may be provided in both the positive electrode wiring and the negative electrode wiring.

The electrical power supply system 10 may include various sensors such as voltage sensors and current sensors, and elements such as fuses, resistors, coils, and capacitors, in addition to the above-described elements.

Figure 4:
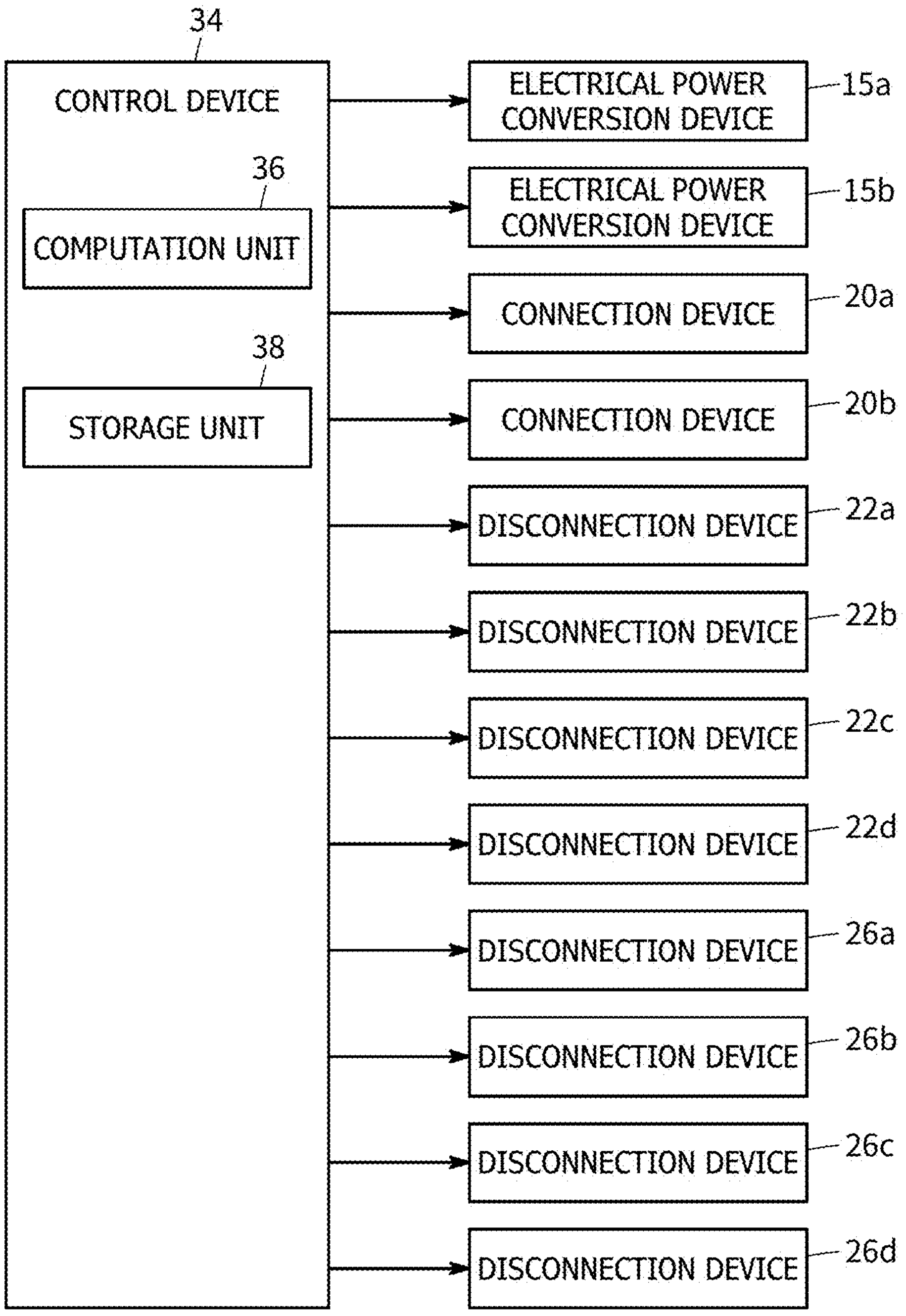
FIG. 4 is a control block diagram of a control device.

FIG. 4 is a control block diagram of a control device 34 according to the present embodiment. As shown in FIG. 4, the electrical power supply system 10 is equipped with the control device 34. The control device 34 controls the first electrical power conversion device 15*a*, the second electrical power conversion device 15*b*, the connection device 20*a*, the connection device 20*b*, the disconnection devices 22*a* to 22*d*, and the disconnection devices 26*a* to 26*d*. The control device 34 may control the connection device 20*a*, the connection device 20*b*, the disconnection devices 22*a* to 22*d*, and the disconnection devices 26*a* to 26*d*, and a control device other than the control device 34 may control the first electrical power conversion device 15*a* and the second electrical power conversion device 15*b*. The control device 34 also may be configured by a plurality of control units (ECU: electronic control unit). In this case, for example, the control device 34 may include a control unit for controlling the disconnection device 22*a* of the first electrical power supply circuit 12*a* and a control unit for controlling the disconnection device 22*b* of the second electrical power supply circuit 12*b*.

The control device 34 includes a computation unit 36 and a storage unit 38. The computation unit 36 is a processor such as a CPU (Central Processing Unit) or a GPU (Graphics Processing Unit) or the like. The computation unit 36 controls each of the devices by executing a program that is stored in the storage unit 38. At least part of the computation unit 36 may be realized by an integrated circuit such as an ASIC (Application Specific Integrated Circuit) or an FPGA (Field-Programmable Gate Array) or the like. At least part of the computation unit 36 may be realized by an electronic circuit including a discrete device.

The storage unit 38 is made up of a volatile memory (not illustrated) and a non-volatile memory (not illustrated), each of which is a computer-readable storage medium. The volatile memory, for example, is a RAM (Random Access Memory) or the like. The non-volatile memory, for example, is a ROM (Read Only Memory), a flash memory, or the like. Data and the like are stored in, for example, the volatile memory. Programs, tables, maps, and the like are stored, for example, in the non-volatile memory. At least part of the storage unit 38 may be included in the processor, the integrated circuit, or the like described above.

FIG. 12 is a schematic diagram of a moving object 44. As shown in FIG. 12, the electrical power supply system 10 is mounted on the moving object 44.

The moving object 44 of the present embodiment is an electric vertical takeoff and landing aircraft (eVTOL aircraft). The moving object 44 is equipped with eight VTOL rotors 46. The VTOL rotors 46 generate an upwardly directed thrust with respect to a fuselage 48. The moving object 44 is equipped with eight electric motors 50. One of the electric motors 50 drives one of the VTOL rotors 46. The moving object 44 includes two cruise rotors 52. The cruise rotors 52 generate a forwardly directed thrust with respect to the fuselage 48. The moving object 44 is equipped with four electric motors 54. Two of the electric motors 54 drive one of the cruise rotors 52.

Each of the first load device 16*a*, the second load device 16*b*, the third load device 16*c*, and the fourth load device 16*d* may be equipped with two of the electric motors 50 and one of the electric motors 54. Each of the first load device 16*a*, the second load device 16*b*, the third load device 16*c*, and the fourth load device 16*d* may include a low voltage drive device in addition to the electric motors 50 and the electric motor 54.

The moving object 44 is not limited to being an aircraft, but may be a ship, an automobile, a train, or the like.

Figure 5:
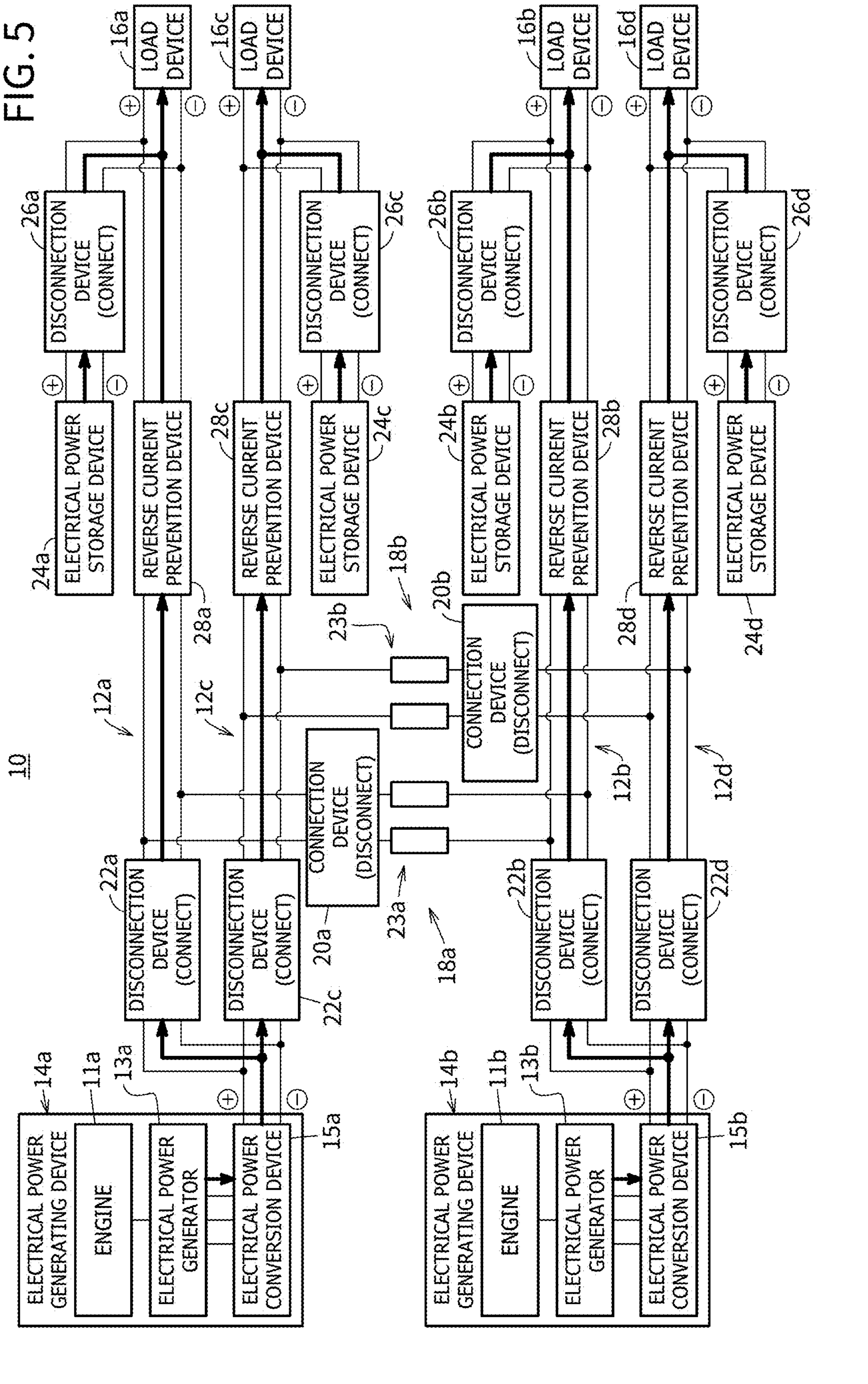
FIG. 5 is a diagram illustrating operations of the electrical power supply system when operating normally.

FIG. 5 is a diagram illustrating operations of the electrical power supply system 10 of the present embodiment when operating normally. The arrows shown in FIG. 5 indicate electrical power supply pathways.

As shown in FIG. 5, the first electrical power generating device 14*a* is connected to the first electrical power supply circuit 12*a* by the disconnection device 22*a*, and the first electrical power generating device 14*a* is connected to the third electrical power supply circuit 12*c* by the disconnection device 22*c*. As a result, the three-phase AC electrical power output from the first electrical power generator 13*a* is converted into DC electrical power by the first electrical power conversion device 15*a*, and the DC electrical power is supplied to the first load device 16*a* and the third load device 16*c*.

The second electrical power generating device 14*b* is connected to the second electrical power supply circuit 12*b* by the disconnection device 22*b*, and the second electrical power generating device 14*b* is connected to the fourth electrical power supply circuit 12*d* by the disconnection device 22*d*. As a result, the three-phase AC electrical power output from the second electrical power generator 13*b* is converted into DC electrical power in the second electrical power conversion device 15*b*, and supplied to the second load device 16*b* and the fourth load device 16*d*.

The first electrical power storage device 24*a* is connected to the first load device 16*a* by the disconnection device 26*a*. As a result, the DC electrical power output from the first electrical power storage device 24*a* is supplied to the first load device 16*a*. The second electrical power storage device 24*b* is connected to the second load device 16*b* by the disconnection device 26*b*. As a result, the DC electrical power output from the second electrical power storage device 24*b* is supplied to the second load device 16*b*. The third electrical power storage device 24*c* is connected to the third load device 16*c* by the disconnection device 26*c*. As a result, the DC electrical power output from the third electrical power storage device 24*c* is supplied to the third load device 16*c*. The fourth electrical power storage device 24*d* is connected to the fourth load device 16*d* by the disconnection device 26*d*. As a result, the DC electrical power output from the fourth electrical power storage device 24*d* is supplied to the fourth load device 16*d*.

Normally, the first electrical power supply circuit 12*a* and the second electrical power supply circuit 12*b* are disconnected by the connection device 20*a*, and the third electrical power supply circuit 12*c* and the fourth electrical power supply circuit 12*d* are disconnected by the connection device 20*b*.

Figure 6:
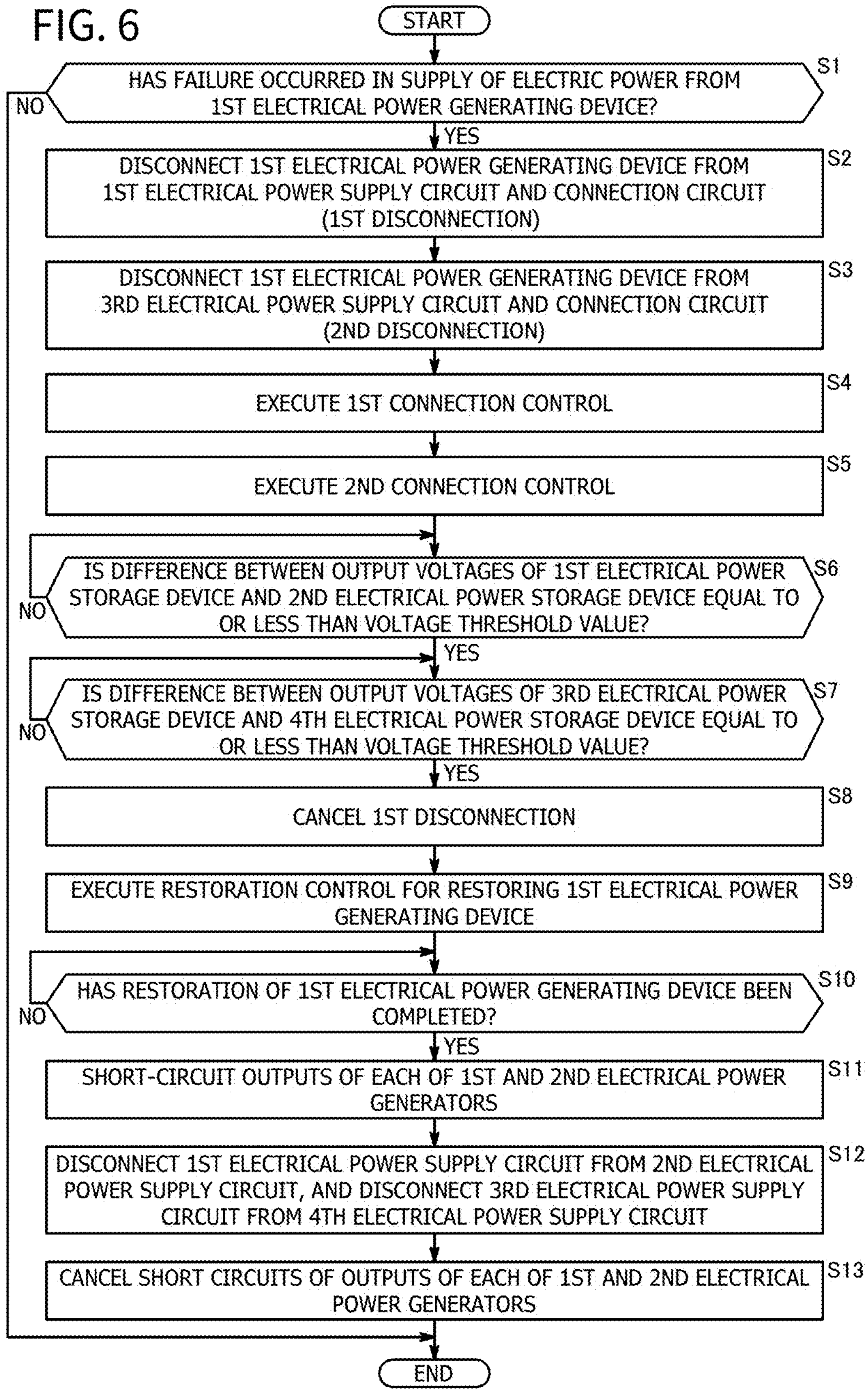
FIG. 6 is a flowchart for explaining an example of a control method of the electrical power supply system according to the embodiment.

FIG. 6 is a flowchart illustrating an example of a control method of the electrical power supply system 10 according to the embodiment. The process of FIG. 6 is executed at a predetermined cycle. FIGS. 7 to 10 are diagrams illustrating operations of the electrical power supply system 10 when operating abnormally. The arrows shown in FIGS. 7 to 10 indicate electrical power supply pathways.

Here, a case that a failure occurs in the supply of electric power from the first electrical power generating device 14*a* to the first electrical power supply circuit 12*a* and the third electrical power supply circuit 12*c* when the moving object 44, which is an electric vertical take-off and landing aircraft, ascends while flying forward to transition to cruise flight, will be described as an example. Hereinafter, the movement of the moving object 44 ascending while flying forward to transition to the cruise flight may be simply referred to as the ascending of the moving object 44. More specifically, a case that the first engine 11*a* has misfired while the moving object 44 is ascending will be described as an example. In this case, it is necessary to restart the first engine 11*a* to maintain the ascent of the moving object 44.

In step S1, the control device 34 determines whether or not a failure has occurred in the supply of electric power from the first electrical power generating device 14*a* to the first electrical power supply circuit 12*a* and the third electrical power supply circuit 12*c*. The control device 34 determines that the failure has occurred, for example, in the case that the supply of electric power from the first electrical power generating device 14*a* to the first electrical power supply circuit 12*a* and the third electrical power supply circuit 12*c* is cut off. The control device 34 may also determine that the failure has occurred, for example, in the case that the electrical power supplied from the first electrical power generating device 14*a* to the first electrical power supply circuit 12*a* and the third electrical power supply circuit 12*c* is lower than a target electrical power. For example, in the case of detecting an abnormality in at least one of the first engine 11*a* or the first electrical power generator 13*a*, the control device 34 may determine that a failure has occurred in the supply of electric power from the first electrical power generating device 14*a* to the first electrical power supply circuit 12*a* and the third electrical power supply circuit 12*c*. The control device 34 may detect an abnormality in at least one of the first engine 11*a* or the first electrical power generator 13*a* in a case that the output of the first electrical power generator 13*a* is lower than a target output, a case that the rotational speed of the first electrical power generator 13*a* is lower than a target rotational speed, a case that the amount of electrical current output from the first electrical power generator 13*a* is lower than a target amount of electrical current, or the like. In the present embodiment, the control device 34 determines whether or not the first engine 11*a* has misfired. The control device 34 may determine whether or not the first engine 11*a* has misfired based on a signal output from a current sensor (not shown) provided in the first electrical power supply circuit 12*a*. The control device 34 may also determine whether or not the first engine 11*a* has misfired based on a signal output from the first electrical power conversion device 15*a*.

In the case it is determined that no failure has occurred in the supply of electric power from the first electrical power generating device 14*a* to the first electrical power supply circuit 12*a* and the third electrical power supply circuit 12*c* (NO in step S1), the process of FIG. 6 is completed.

In the case it is determined that a failure has occurred in the supply of electric power from the first electrical power generating device 14*a* to the first electrical power supply circuit 12*a* and the third electrical power supply circuit 12*c* (YES in step S1), the process transitions to step S2.

Figure 7:
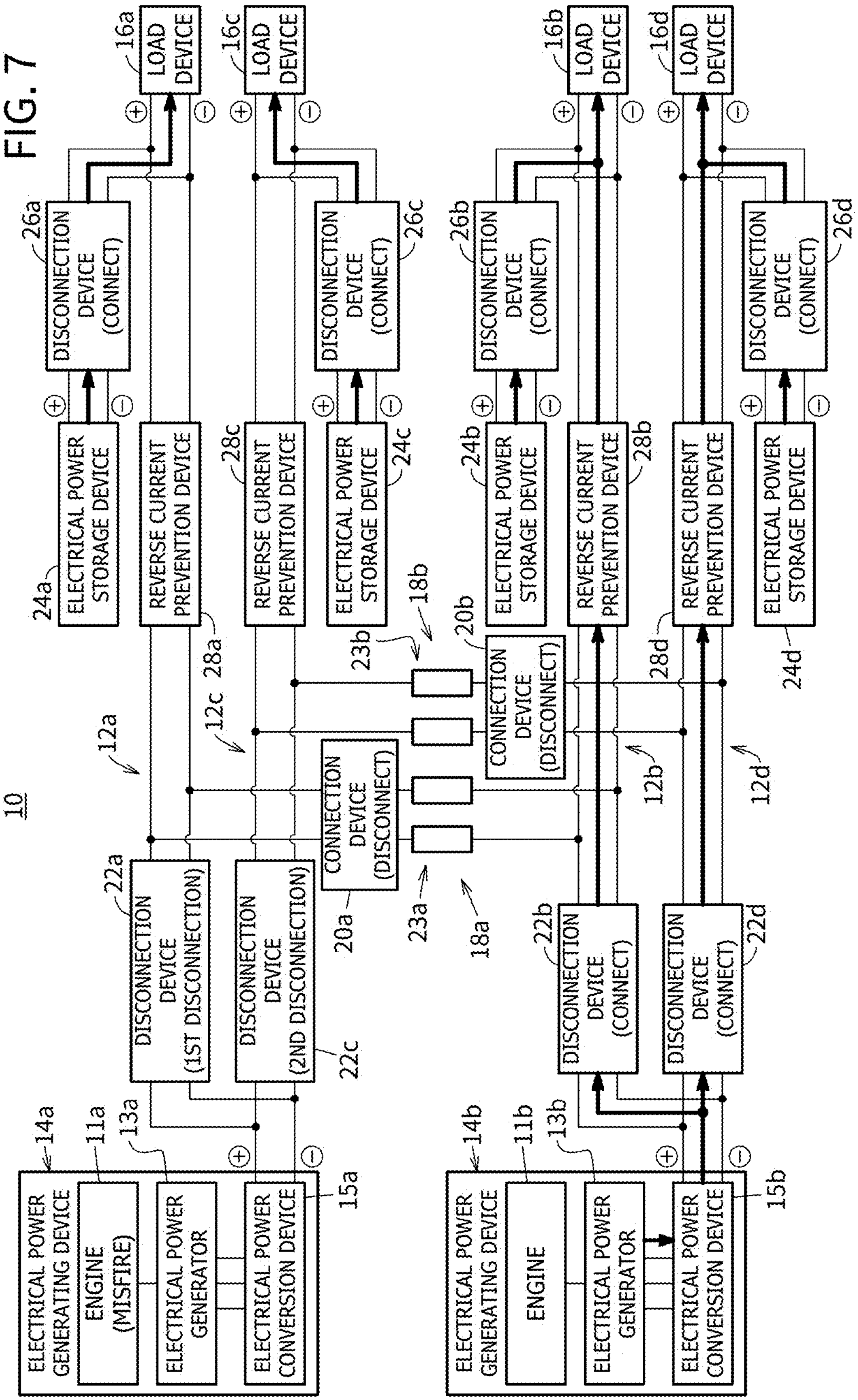
FIG. 7 is a diagram illustrating operations of the electrical power supply system when operating abnormally.

In step S2, the control device 34 controls the disconnection device 22*a* to disconnect the first electrical power generating device 14*a* from the first electrical power supply circuit 12*a* and the connection circuit 18*a*. Hereinafter, this disconnection may be referred to as “first disconnection”. As shown in FIG. 7, when the first disconnection is executed, the supply of electrical power from the first electrical power generating device 14*a* to the first load device 16*a* is cut off. In this case, only the DC electrical power output from the first electrical power storage device 24*a* is supplied to the first load device 16*a*. Therefore, the output voltage and the SOC of the first electrical power storage device 24*a* are likely to be lowered. That is, the output voltage and SOC of the first electrical power storage device 24*a* may be lower than the output voltage and SOC of the second electrical power storage device 24*b*. In addition, the electrical charge of the smoothing capacitor 21 of the first electrical power conversion device 15*a* is discharged. Thereafter, the process transitions to step S3.

In step S3, the control device 34 controls the disconnection device 22*c* to disconnect the first electrical power generating device 14*a* from the third electrical power supply circuit 12*c* and the connection circuit 18*b*. This disconnection may be referred to as "second disconnection". As shown in FIG. 7, when the second disconnection is executed, the supply of electrical power from the first electrical power generating device 14*a* to the third load device 16*c* is cut off. In this case, only the DC electrical power output from the third electrical power storage device 24*c* is supplied to the third load device 16*c*. Therefore, the output voltage and SOC of the third electrical power storage device 24*c* are likely to be lowered. That is, the output voltage and SOC of the third electrical power storage device 24*c* may be lower than the output voltage and SOC of the fourth electrical power storage device 24*d*. Step S3 may be performed at the same time as step S2 or before step S2. After steps S2 and S3, the process transitions to step S4.

Figure 8:
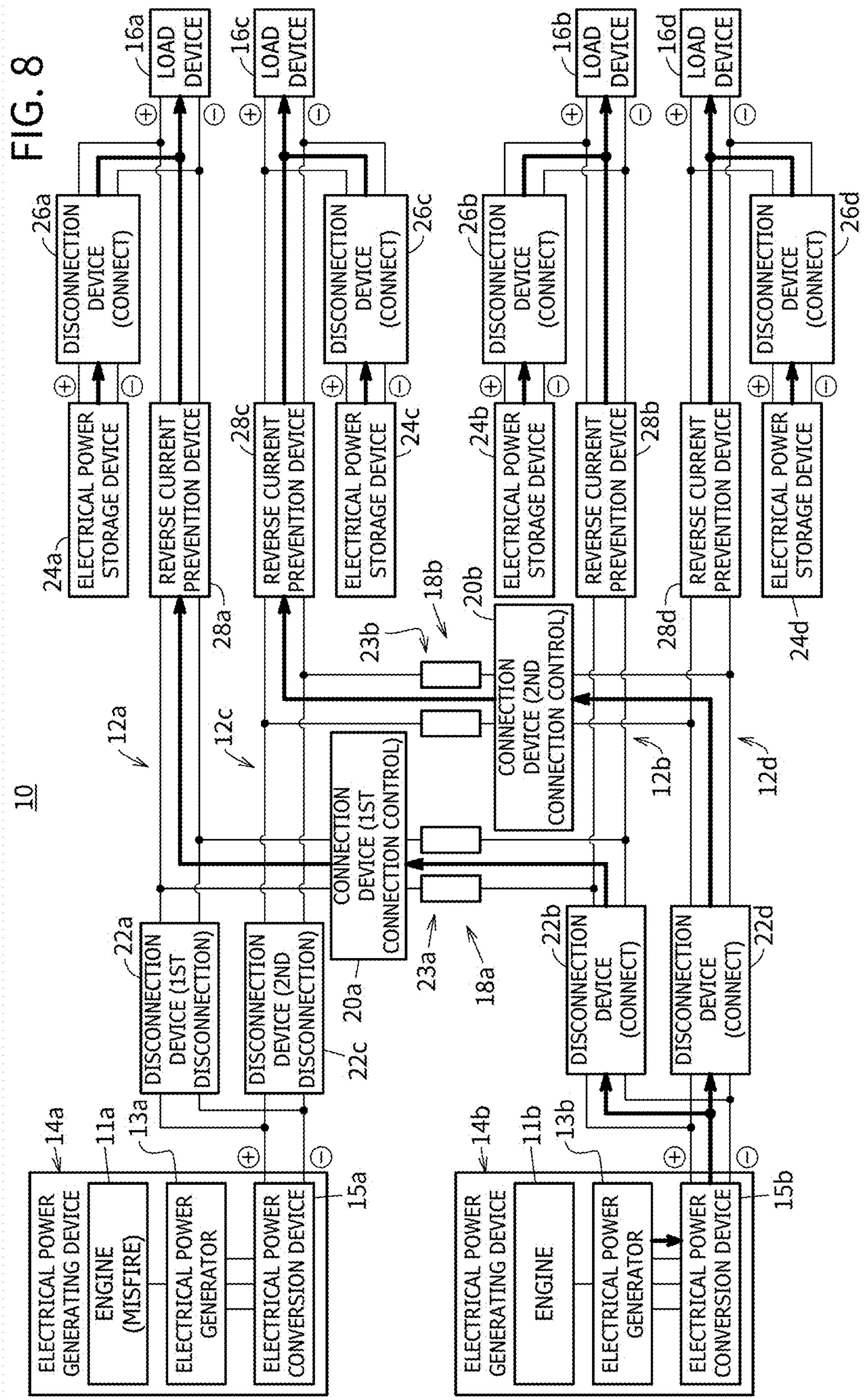
FIG. 8 is a diagram illustrating operations of the electrical power supply system when operating abnormally.

In step S4, the control device 34 executes a first connection control on the connection device 20*a*. In accordance with this control, as shown in FIG. 8, the first electrical power supply circuit 12*a* and the second electrical power supply circuit 12*b* are connected via the connection circuit 18*a*. The DC electrical power output from the second electrical power generating device 14*b* is supplied to the first load device 16*a* via the second electrical power supply circuit 12*b*, the connection circuit 18*a*, and the first electrical power supply circuit 12*a*. As a result, the output of the electric motors 50 and 54 of the first load device 16*a* is prevented from excessively decreasing due to the decrease in the output voltage of the first electrical power storage device 24*a*. Depending on the conditions, the DC electrical power output from the second electrical power generating device 14*b* may be charged to the first electrical power storage device 24*a*.

The reactors 23*a* are connected in series to the connection device 20*a*. When the supply of electrical power from the second electrical power supply circuit 12*b* to the first electrical power supply circuit 12*a* is started by switching to the first connection control, a counter-electromotive force is generated in the reactors 23*a*, and therefore the peak value of the inrush current flowing from the second electrical power supply circuit 12*b* to the first electrical power supply circuit 12*a* is suppressed to be low. Therefore, damage to the first load device 16*a* or the first electrical power storage device 24*a* can be suppressed.

Further, since the DC electrical power output from the second electrical power generating device 14*b* is supplied to the first load device 16*a*, the load of the first electrical power storage device 24*a* is reduced, and therefore, the decrease in the output voltage and SOC of the first electrical power storage device 24*a* is suppressed. In this case, since no electrical power is supplied from the second electrical power generating device 14*b* to the second load device 16*b*, only the DC electrical power output from the second electrical power storage device 24*b* is supplied to the second load device 16*b*. Therefore, the output voltage and SOC of the second electrical power storage device 24*b* are likely to be lowered. Thereafter, the process transitions to step S5.

In step S5, the control device 34 executes a second connection control on the connection device 20*b*. In accordance with this control, as shown in FIG. 8, the third electrical power supply circuit 12*c* and the fourth electrical power supply circuit 12*d* are connected via the connection circuit 18*b*. The DC electrical power output from the second electrical power generating device 14*b* is supplied to the third load device 16*c* via the fourth electrical power supply circuit 12*d*, the connection circuit 18*b*, and the third electrical power supply circuit 12*c*. As a result, the output of the electric motors 50 and 54 of the third load device 16*c* is prevented from excessively decreasing due to the decrease in the output voltage of the third electrical power storage device 24*c*. Depending on the conditions, the DC electrical power output from the second electrical power generating device 14*b* may be charged to the third electrical power storage device 24*c*.

The reactors 23*b* are connected in series to the connection device 20*b*. When the supply of electrical power from the fourth electrical power supply circuit 12*d* to the third electrical power supply circuit 12*c* is started by switching to the second connection control, a counter-electromotive force is generated in the reactors 23*b*, and therefore the peak value of the inrush current flowing from the fourth electrical power supply circuit 12*d* to the third electrical power supply circuit 12*c* is suppressed to be low. Therefore, damage to the third load device 16*c* or the third electrical power storage device 24*c* can be suppressed.

Further, since the DC electrical power output from the second electrical power generating device 14*b* is supplied to the third load device 16*c*, the load of the third electrical power storage device 24*c* is reduced, and therefore, the decrease in the output voltage and SOC of the third electrical power storage device 24*c* is suppressed. In this case, since no electrical power is supplied from the second electrical power generating device 14*b* to the fourth load device 16*d*, only the DC electrical power output from the fourth electrical power storage device 24*d* is supplied to the fourth load device 16*d*. Therefore, the output voltage and SOC of the fourth electrical power storage device 24*d* are likely to be lowered. When the output voltages (SOC) of the first electrical power storage device 24*a*, the second electrical power storage device 24*b*, the third electrical power storage device 24*c*, and the fourth electrical power storage device 24*d* are equal to each other, the electrical power output from the second electrical power generating device 14*b* is supplied to each of the first load device 16*a*, the second load device 16*b*, the third load device 16*c*, and the fourth load device 16*d*. It is noted that step S5 may be performed at the same time as step S4 or before step S4. After steps S4 and S5, the process transitions to step S6.

In step S6, the control device 34 determines whether or not the difference between the output voltage of the first electrical power storage device 24*a* and the output voltage of the second electrical power storage device 24*b* is equal to or less than a predetermined voltage threshold value. In the case it is determined that the difference between the output voltage of the first electrical power storage device 24*a* and the output voltage of the second electrical power storage device 24*b* is greater than the voltage threshold value (NO in step S6), the process of step S6 is repeated. In the case it is determined that the difference between the output voltage of the first electrical power storage device 24*a* and the output voltage of the second electrical power storage device 24*b* is equal to or less than the voltage threshold value (YES in step S6), the process transitions to step S7.

In step S7, the control device 34 determines whether or not the difference between the output voltage of the third electrical power storage device 24*c* and the output voltage of the fourth electrical power storage device 24*d* is equal to or less than a predetermined voltage threshold value. In the case it is determined that the difference between the output voltage of the third electrical power storage device 24*c* and the output voltage of the fourth electrical power storage device 24*d* is greater than the voltage threshold value (NO in step S7), the process of step S7 is repeated. In the case it is determined that the difference between the output voltage of the third electrical power storage device 24*c* and the output voltage of the fourth electrical power storage device 24*d* is equal to or less than the voltage threshold value (YES in step S7), the process transitions to step S8.

Figure 9:
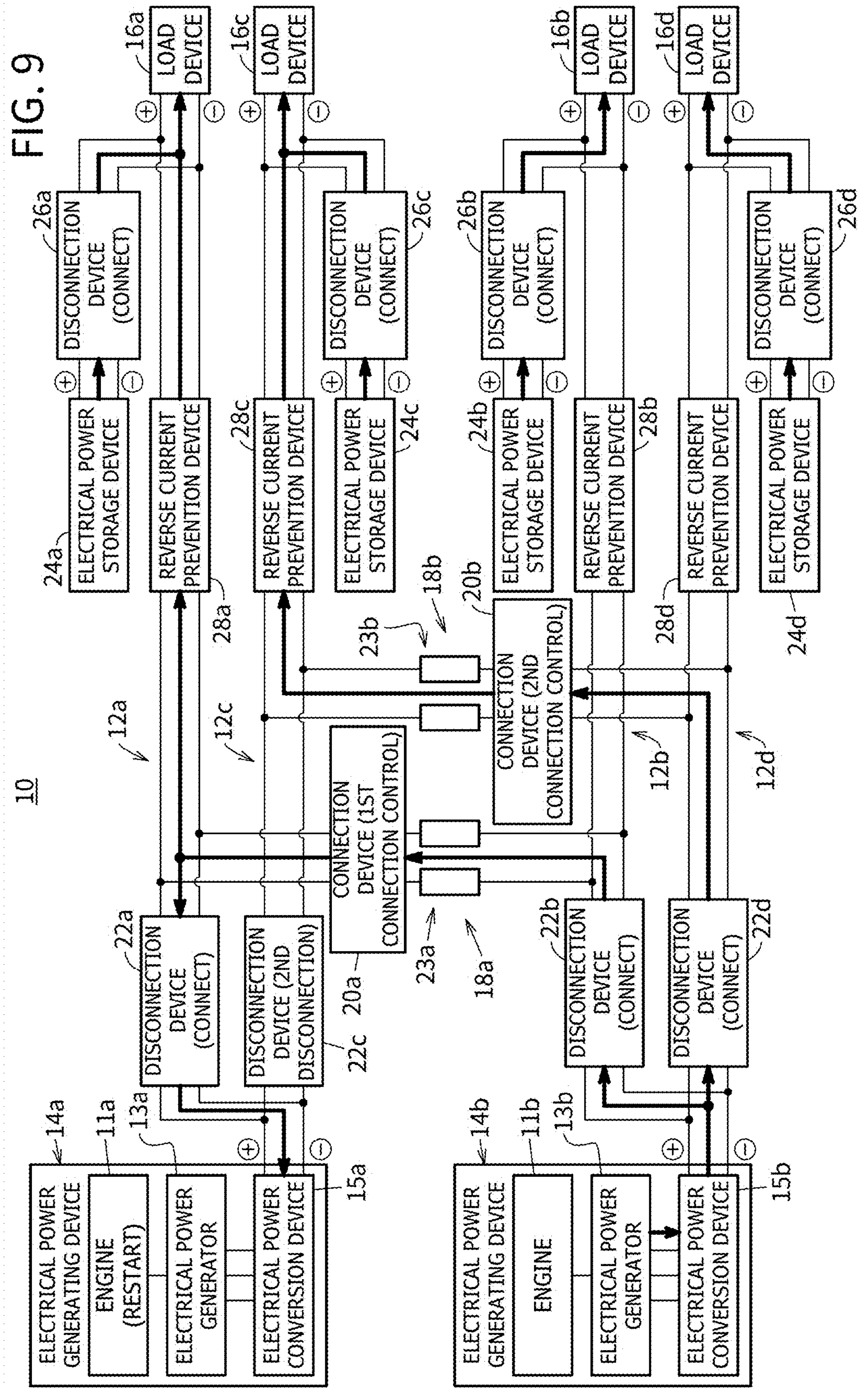
FIG. 9 is a diagram illustrating operations of the electrical power supply system when operating abnormally.

In step S8, the control device 34 cancels the first disconnection. As a result, as shown in FIG. 9, the DC electrical power output from the second electrical power generating device 14*b* is supplied to the first electrical power conversion device 15*a* via the second electrical power supply circuit 12*b*, the connection circuit 18*a*, and the first electrical power supply circuit 12*a*. As a result, the smoothing capacitor 21 of the first electrical power conversion device 15*a* is charged. Further, when the current flowing through the connection circuit 18*a* increases by canceling the first disconnection, a counter-electromotive force is generated in the reactors 23*a*, so that the peak value of the inrush current flowing from the first electrical power supply circuit 12*a* to the first electrical power conversion device 15*a* is suppressed to be low. Therefore, damage to the first electrical power conversion device 15*a* can be suppressed. In step S8, the DC electrical power output from the second electrical power generating device 14*b* can be supplied to the first load device 16*a*. Thereafter, the process transitions to step S9.

In step S9, the control device 34 executes a restoration control for restoring the first electrical power generating device 14*a*. Specifically, the control device 34 controls the first electrical power conversion device 15*a* to restart the first engine 11*a* by the electrical power charged in the smoothing capacitor 21 of the first electrical power conversion device 15*a*. Thereafter, the process transitions to step S10.

In step S10, the control device 34 determines whether or not the restoration of the first electrical power generating device 14*a* has been completed. In other words, the control device 34 determines whether or not the first engine 11*a* has restarted. In the case it is determined that the restoration of the first electrical power generating device 14*a* is not completed (NO in step S10), the process of step S10 is repeated. In the case it is determined that the restoration of the first electrical power generating device 14*a* is completed (YES in step S10), the process transitions to step S11.

Figure 10:
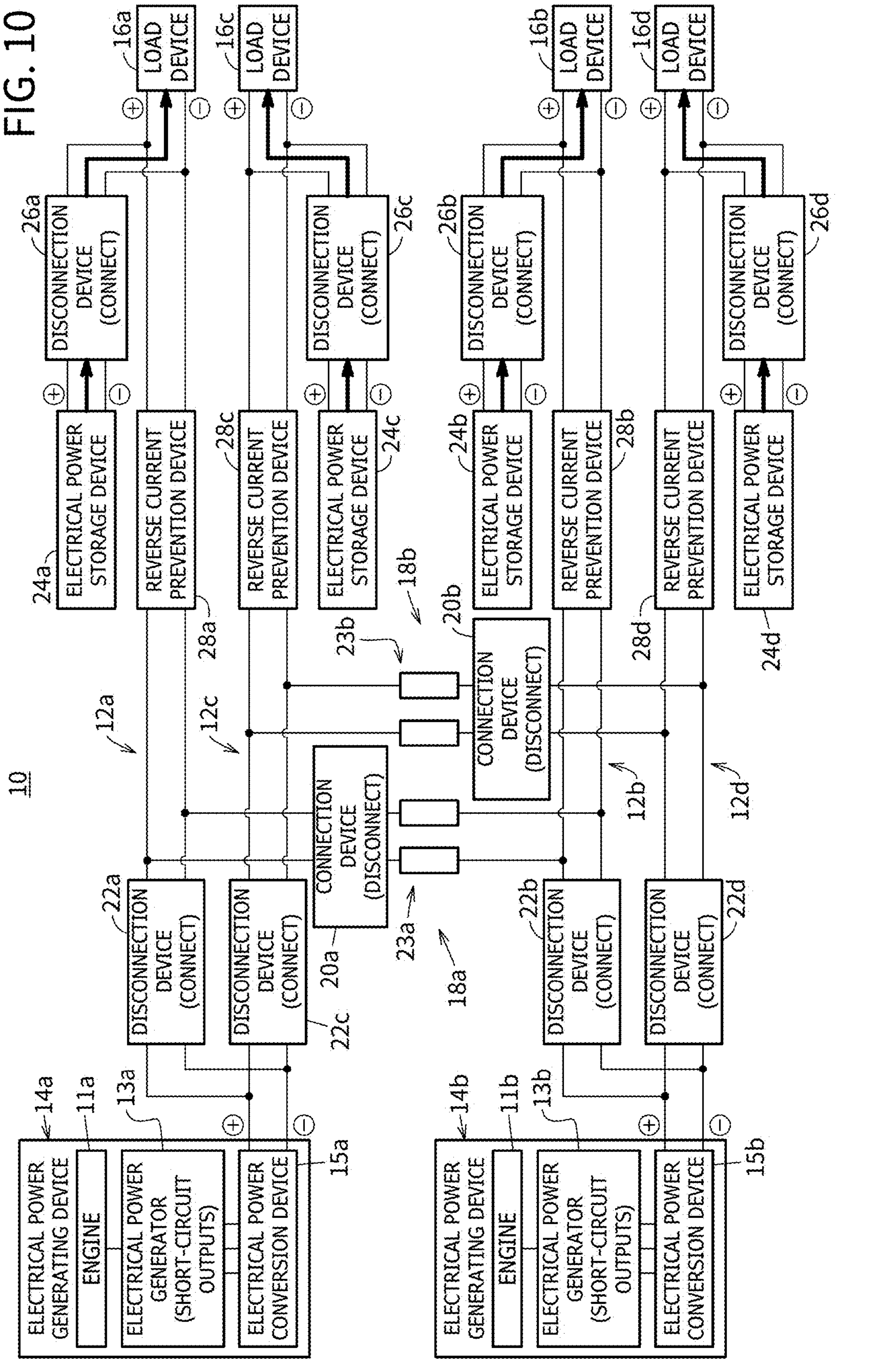
FIG. 10 is a diagram illustrating operations of the electrical power supply system when operating abnormally.
Figure 11:
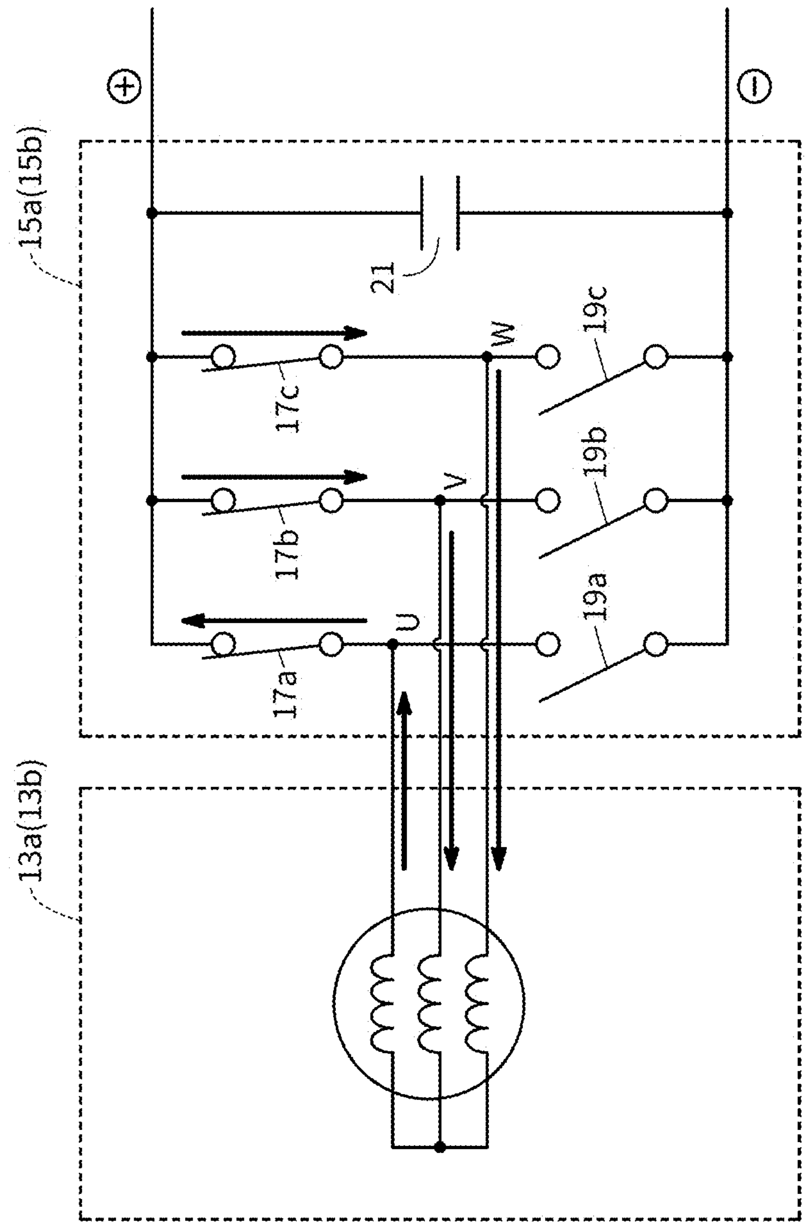
FIG. 11 is a diagram illustrating a state in which outputs of a first electrical power generator are short-circuited.

In step S11, the control device 34 short-circuits the outputs of the first electrical power generator 13*a* and the second electrical power generator 13*b* (see FIG. 10). FIG. 11 is a diagram illustrating a state in which the outputs of the first electrical power generator 13*a* are short-circuited. As shown in FIG. 11, in the case that the outputs of the first electrical power generator 13*a* are short-circuited, each of the switching elements 17*a* to 17*c* of the upper arm is turned on (connected state). The phase of the voltage of the U-phase, the phase of the voltage of the V-phase, and the phase of the voltage of the W-phase of the first electrical power generator 13*a* are shifted by 120 degrees, respectively. By short-circuiting the outputs of the first electrical power generator 13*a*, the U-phase voltage, the V-phase voltage, and the W-phase voltage cancel out each other, and the output voltage of the first electrical power generator 13*a* can be made zero.

In the case that the outputs of the first electrical power generator 13*a* are short-circuited, each of the switching elements 19*a* to 19*c* of the lower arm may be turned on (connected state). In the case that each of the switching elements 19*a* to 19*c* of the lower arm is turned on (connected state), the output voltage of the first electrical power generator 13*a* can be made zero.

The outputs of the second electrical power generator 13*b* can be short-circuited by controlling the second electrical power generating device 14*b* in the same manner as the first electrical power generating device 14*a*. Thereafter, the process transitions to step S12.

In step S12, the control device 34 controls the connection device 20*a* to disconnect the first electrical power supply circuit 12*a* from the second electrical power supply circuit 12*b*, and controls the connection device 20*b* to disconnect the third electrical power supply circuit 12*c* from the fourth electrical power supply circuit 12*d*. As shown in FIG. 10, in this case, the connection devices 20*a* and 20*b* can be disconnected in a state where the current flowing through the connection devices 20*a* and 20*b* is suppressed. In this case, it is possible to suppress the generation of arcs from the connection devices 20*a* and 20*b* at the time of disconnection. This makes it possible to make the contactors of the connection devices 20*a* and 20*b* relatively small in capacity, and thus to make the connection devices 20*a* and 20*b* small in size and light in weight. Thereafter, the process transitions to step S13.

In step S13, the control device 34 cancels the short circuit of the outputs of the first electrical power generator 13*a* and the second electrical power generator 13*b*. As a result, the electrical power supply system 10 returns to the control in the normal operation. Thereafter, the process of FIG. 6 is completed.

In the above-described method of controlling the electrical power supply system 10, the case that the first electrical power generating device 14*a* is restored in the case of misfire of the first engine 11*a* has been described as an example, but the same control can be executed in the case of misfire of the second engine 11*b*. In the method of controlling the electrical power supply system 10, the control during the ascending of the moving object 44 is described as an example, but the same control can be executed during the taking off (hovering), cruising, descending, and landing of the moving object 44. Furthermore, in the case that it is determined that a failure has occurred in the supply of electric power from the first electrical power generating device 14*a* to the first electrical power supply circuit 12*a* (YES in step S1), and it is determined that the failure is a misfire of the first engine 11*a* after the processes of steps S2 and S3 are performed, the process may proceed to the processes of steps S4 and S5.

According to the present embodiment, the connection circuit 18*a* includes reactors 23*a* connected in series to the connection device 20*a*. In this case, since a counter-electromotive force is generated in each of the reactors 23*a* when the first connection control is executed for the connection device 20*a*, the peak value of the inrush current flowing in the first electrical power supply circuit 12*a* or the second electrical power supply circuit 12*b* is suppressed to be low. In accordance with this feature, damage to the electronic devices (for example, the first load device 16*a* or the second load device 16*b*) provided in the first electrical power supply circuit 12*a* or the second electrical power supply circuit 12*b* can be suppressed. In the case that a failure has occurred in the supply of electrical power from the first electrical power generating device 14*a* to the first electrical power supply circuit 12*a*, electrical power can be supplied from the second electrical power supply circuit 12*b* to the first load device 16*a* via the connection circuit 18*a* and the first electrical power supply circuit 12*a* by executing the first connection control on the connection device 20*a*. Furthermore, since the first connection control is executed in a state in which the first electrical power supply circuit 12*a* and the connection circuit 18*a* are disconnected from the first electrical power generating device 14*a* by the disconnection device 22*a*, it is possible to prevent the inrush current from flowing to the first electrical power generating device 14*a*. Therefore, damage of the first electrical power generating device 14*a* due to the inrush current can be suppressed. Further, for example, in the case that the failure in the supply of electric power from the first electrical power generating device 14*a* to the first electrical power supply circuit 12*a* is a short circuit, it is possible to prevent further failures in the electrical power supply system 10, such as failures in the second electrical power generating device 14*b* and the like. Accordingly, it is possible to provide the more satisfactory electrical power supply system 10, the more satisfactory moving object 44, and the method of more satisfactorily controlling such an electrical power supply system 10.

The electrical power supply system 10 according to the present embodiment is not limited to the configuration described above. In the electrical power supply system 10, for example, the third electrical power supply circuit 12*c*, the fourth electrical power supply circuit 12*d*, and the connection circuit 18*b* may be omitted. In this case, the third load device 16*c* and the like provided in the third electrical power supply circuit 12*c* and the fourth load device 16*d* and the like provided in the fourth electrical power supply circuit 12*d* are also omitted.

The following supplementary notes are further disclosed in relation to the above-described embodiments.

Supplementary Note 1

The electrical power supply system (10) according to the present disclosure includes the first electrical power supply circuit (12*a*) configured to supply to the first load device (16*a*) the electrical power output from the first electrical power generating device (14*a*), the electrical power being the direct current electrical power, the second electrical power supply circuit (12*b*) configured to supply to the second load device (16*b*) the electrical power output from the second electrical power generating device (14*b*), the electrical power being the direct current electrical power, the connection circuit (18*a*) equipped with the connection device (20*a*) configured to connect the first electrical power supply circuit and the second electrical power supply circuit to each other, and the control device (34) configured to execute the connection control on the connection device in order to connect the first electrical power supply circuit and the second electrical power supply circuit to each other via the connection circuit, and the disconnection device (22*a*) configured to disconnect the first electrical power generating device from the first electrical power supply circuit and the connection circuit, wherein the connection circuit is further equipped with the reactor (23*a*) configured to be connected in series to the connection device, and in the case that the failure has occurred in supply of the electrical power from the first electrical power generating device to the first electrical power supply circuit, the control device executes the connection control on the connection device in the state in which the first electrical power supply circuit and the connection circuit are disconnected from the first electrical power generating device by the disconnection device.

In accordance with such a configuration, the connection circuit includes the reactor connected in series to the connection device. In this case, since a counter-electromotive force is generated in the reactor when the connection control is executed on the connection device, the peak value of the inrush current flowing in the first electrical power supply circuit or the second electrical power supply circuit is suppressed to be low. Accordingly, damage to the electronic devices (for example, the first load device or the second load device) provided in the first electrical power supply circuit or the second electrical power supply circuit can be suppressed. Further, in the case that a failure has occurred in the supply of electrical power from the first electrical power generating device to the first electrical power supply circuit, electrical power can be supplied from the second electrical power supply circuit to the first load device via the connection circuit and the first electrical power supply circuit by executing the connection control on the connection device. Furthermore, since the connection control is executed in a state in which the first electrical power supply circuit and the connection circuit are disconnected from the first electrical power generating device by the disconnection device, it is possible to prevent the inrush current from flowing to the first electrical power generating device. Therefore, damage of the first electrical power generating device due to the inrush current can be suppressed. Further, for example, in the case that the failure in the supply of electric power from the first electrical power generating device to the first electrical power supply circuit is a short circuit, it is possible to prevent further failures in the electrical power supply system, such as failures in the second electrical power generating device and the like. Accordingly, a more satisfactory electrical power supply system can be provided.

Supplementary Note 2

In the electrical power supply system according to Supplementary Note 1, by canceling disconnection by the disconnection device after the connection control is executed on the connection device, the control device may supply electrical power from the second electrical power supply circuit to the first electrical power generating device to execute a restoration control on the first electrical power generating device in order to restore the first electrical power generating device.

In accordance with such a configuration, the first electrical power generating device can be restored by the electrical power supplied from the second electrical power supply circuit.

Supplementary Note 3

In the electrical power supply system according to Supplementary Note 2, in the case that the first electrical power generating device is restored by the restoration control, the control device may control the connection device to disconnect the first electrical power supply circuit from the second electrical power supply circuit.

In accordance with such a configuration, the connection between the first electrical power supply circuit and the second electrical power supply circuit can be disconnected after the first electrical power generating device restores. Thus, in the case that an overcurrent occurs in one of the first electrical power supply circuit or the second electrical power supply circuit, it is possible to prevent the overcurrent from flowing into the other.

Supplementary Note 4

In the power supply system described in Supplementary Note 3, the first electrical power generating device may include the first electrical power generator (13*a*) configured to output the three-phase alternating current electrical power, and the first electrical power conversion device (15*a*) configured to convert the three-phase alternating current electrical power output from the first electrical power generator into the direct current electrical power, the second electrical power generating device may include the second electrical power generator (13*b*) configured to output the three-phase alternating current electrical power, and the second electrical power conversion device (15*b*) configured to convert the three-phase alternating current electrical power output from the second electrical power generator into the direct current electrical power, and in the case that the first electrical power generating device is restored by the restoration control, the control device controls the connection device to disconnect the first electrical power supply circuit from the second electrical power supply circuit, in the state in which outputs of the first electrical power generator and the second electrical power generator are short-circuited.

In accordance with such a configuration, the first electrical power supply circuit can be disconnected from the second electrical power supply circuit by the connection device in a state in which the output voltage of each of the first electrical power generating device and the second electrical power generating device is suppressed. In this case, it is possible to suppress the generation of arcs from the connection device at the time of disconnection. Therefore, the connection device can be made small in size and light in weight.

Supplementary Note 5

The electrical power supply system according to any one of Supplementary Notes 2 to 4 may further include the first electrical power storage device (24*a*) configured to be connected to the first electrical power supply circuit and in parallel with the first electrical power generating device, and the second electrical power storage device (24*b*) configured to be connected to the second electrical power supply circuit and in parallel with the second electrical power generating device, wherein the control device may cancel the disconnection by the disconnection device and execute the restoration control, after the difference between the output voltage of the first electrical power storage device and the output voltage of the second electrical power storage device becomes equal to or less than the predetermined voltage threshold value in the state that the connection control is executed on the connection device.

In accordance with such a configuration, in the case that the supply of electrical power from the first electrical power generating device to the first electrical power supply circuit is cut off, the electrical power supplied from the second electrical power supply circuit to the first electrical power supply circuit via the connection circuit can be supplied to the first load device or the first electrical power storage device in a preferential manner. As a result, it is possible to suppress the shortage of electrical power supplied to the first load device due to the decrease in output voltage (SOC) of the first electrical power storage device.

Supplementary Note 6

The moving object (44) according to the present disclosure includes the electrical power supply system according to any one of Supplementary Notes 1 to 5.

In accordance with such a configuration, a more satisfactory movable body can be obtained.

Supplementary Note 7

In the method of controlling the electrical power supply system according to the present disclosure, the electrical power supply system includes the first electrical power supply circuit configured to supply to the first load device the electrical power output from the first electrical power generating device, the electrical power being the direct current electrical power, the second electrical power supply circuit configured to supply to the second load device the electrical power output from the second electrical power generating device, the electrical power being the direct current electrical power, the connection circuit equipped with the connection device configured to connect the first electrical power supply circuit and the second electrical power supply circuit to each other, and the disconnection device configured to disconnect the first electrical power generating device from the first electrical power supply circuit and the connection circuit, the connection circuit being further equipped with the reactor configured to be connected in series to the connection device, and the method includes in the case that the failure has occurred in supply of the electrical power from the first electrical power generating device to the first electrical power supply circuit, executing the connection control on the connection device in order to connect the first electrical power supply circuit and the second electrical power supply circuit to each other via the connection circuit in the state in which the first electrical power supply circuit and the connection circuit are disconnected from the first electrical power generating device by the disconnection device.

In accordance with such a method, a better method of controlling the electrical power supply system can be obtained.

While the present disclosure has been described in detail, the present disclosure is not limited to the individual embodiments described above. Within a range that does not depart from the essence and gist of the present disclosure, or within a range that does not depart from the gist and essence of the present disclosure derived from the content described in the claims and equivalents thereof, various additions, substitutions, changes, partial deletions, or the like can be made to such embodiments. These embodiments may also be implemented in combination. For example, in the embodiments described above, the order of the operations and the order of the processes are shown as examples, and the present invention is not limited to such operations and processes. The same applies to the case where numerical values or mathematical expressions are used in the description of the above-described embodiments.

The invention claimed is:

1. An electrical power supply system comprising:

a first electrical power supply circuit configured to supply to a first load device an electrical power output from a first electrical power generating device, the electrical power being a direct current electrical power;

a second electrical power supply circuit configured to supply to a second load device an electrical power output from a second electrical power generating device, the electrical power being a direct current electrical power;

a connection circuit equipped with a connection device configured to connect the first electrical power supply circuit and the second electrical power supply circuit to each other; and a control device configured to execute a connection control on the connection device in order to connect the first electrical power supply circuit and the second electrical power supply circuit to each other via the connection circuit; and a disconnection device configured to disconnect the first electrical power generating device from the first electrical power supply circuit and the connection circuit, wherein the connection circuit is further equipped with a reactor configured to be connected in series to the connection device, wherein the first electrical power generating device includes a first electrical power generator configured to output three-phase alternating current electrical power, and a first electrical power conversion device configured to convert the three-phase alternating current electrical power output from the first electrical power generator into direct current electrical power, the first electrical power conversion device includes a smoothing capacitor, and the control device includes one or more processors that execute computer-executable instructions stored in a memory, wherein the one or more processors execute the computer-executable instructions to cause the control device to:

in a case that a failure has occurred in supply of the electrical power from the first electrical power generating device to the first electrical power supply circuit, after the control device executes the connection control on the connection device in a state in which the first electrical power supply circuit and the connection circuit are disconnected from the first electrical power generating device by the disconnection device, by canceling disconnection by the disconnection device, the control device supplies electrical power from the second electrical power supply circuit to the first electrical power generating device to execute a restoration control on the first electrical power generating device in order to restore the first electrical power generating device, and in a case where after the restoration control attempts to restart the first electrical power generating device with electrical power charged in the smoothing capacitor, the control device determines that the restoration is not completed because the restart has not been performed properly, the restoration control charges the smoothing capacitor with electrical power supplied by the second electrical power supply circuit and repeatedly attempts the restart.

2. The electrical power supply system according to claim 1, wherein in a case that the first electrical power generating device is restored by the restoration control, the control device controls the connection device to disconnect the first electrical power supply circuit from the second electrical power supply circuit.

3. The electrical power supply system according to claim 2, wherein the first electrical power generating device includes a first electrical power generator configured to output a three-phase alternating current electrical power, and a first electrical power conversion device configured to convert the three-phase alternating current electrical power output from the first electrical power generator into the direct current electrical power, the second electrical power generating device includes a second electrical power generator configured to output a three-phase alternating current electrical power, and a second electrical power conversion device configured to convert the three-phase alternating current electrical power output from the second electrical power generator into the direct current electrical power, and in the case that the first electrical power generating device is restored by the restoration control, the control device controls the connection device to disconnect the first electrical power supply circuit from the second electrical power supply circuit, in a state in which outputs of the first electrical power generator and the second electrical power generator are short-circuited.

4. The electrical power supply system according to claim 1, further comprising:

a first electrical power storage device configured to be connected to the first electrical power supply circuit and in parallel with the first electrical power generating device; and a second electrical power storage device configured to be connected to the second electrical power supply circuit and in parallel with the second electrical power generating device, wherein the control device cancels the disconnection by the disconnection device and executes the restoration control, after a difference between an output voltage of the first electrical power storage device and an output voltage of the second electrical power storage device becomes equal to or less than a predetermined voltage threshold value in a state that the connection control is executed on the connection device.

5. A moving object comprising the electrical power supply system according to claim 1.

6. The electrical power supply system according to claim 1, further comprising:

a first electrical power storage device connected to the first electrical power supply circuit in parallel with the first electrical power generating device; and a second electrical power storage device connected to the second electrical power supply circuit in parallel with the second electrical power generating device, wherein a reverse current prevention device is provided between the disconnection device and each of the first electrical power storage device and the second electrical power storage device in each of the first electrical power supply circuit and the second electrical power supply circuit, and between the disconnection device and the reverse current prevention device, the connection device is connected to each of the first electrical power supply circuit and the second electrical power supply circuit.

7. A method of controlling an electrical power supply system, the electrical power supply system including:

a first electrical power supply circuit configured to supply to a first load device an electrical power output from a first electrical power generating device, the electrical power being a direct current electrical power;

a second electrical power supply circuit configured to supply to a second load device an electrical power output from a second electrical power generating device, the electrical power being a direct current electrical power;

a connection circuit equipped with a connection device configured to connect the first electrical power supply circuit and the second electrical power supply circuit to each other; and a disconnection device configured to disconnect the first electrical power generating device from the first electrical power supply circuit and the connection circuit, the connection circuit being further equipped with a reactor configured to be connected in series to the connection device, the first electrical power generating device includes a first electrical power generator configured to output three-phase alternating current electrical power, and a first electrical power conversion device configured to convert the three-phase alternating current electrical power output from the first electrical power generator into direct current electrical power, the first electrical power conversion device includes a smoothing capacitor, and the method comprising:

in a case that a failure has occurred in supply of the electrical power from the first electrical power generating device to the first electrical power supply circuit, after executing a connection control on the connection device in order to connect the first electrical power supply circuit and the second electrical power supply circuit to each other via the connection circuit in a state in which the first electrical power supply circuit and the connection circuit are disconnected from the first electrical power generating device by the disconnection device, by canceling disconnection by the disconnection device, suppling electrical power from the second electrical power supply circuit to the first electrical power generating device to execute a restoration control on the first electrical power generating device in order to restore the first electrical power generating device; and in a case where after the restoration control attempts to restart the first electrical power generating device with electrical power charged in the smoothing capacitor, determining that the restoration is not completed because the restart has not been performed properly, the restoration control charging the smoothing capacitor with electrical power supplied by the second electrical power supply circuit and repeatedly attempting the restart.

* * * * *